Patented June 24, 1952

2,601,479

UNITED STATES PATENT OFFICE 2,601,479

THIOPHENE AND HALOTHIOPHENE-CARBOXALDEHYDES

Arthur W. Weston, Waukegan, Ill., assignor to Abbott Laboratories, North Chicago, Ill., a corporation of Illinois No Drawing. Application May 12, 1949, Serial No. 92,961

4 Claims. (Cl. 260—329)

This application is a continuation-in-part of my prior application Serial No. 776,155, filed September 25, 1947, now abandoned.

The present invention relates to new compositions of matter and more particularly to certain heterocyclic compounds containing the thiopene ring and the preparation thereof.

The invention comprises the preparation of novel thiophene-carboxaldehyde and derivatives thereof. The general formula of the novel compounds is:

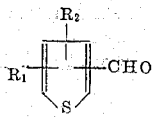

wherein $R_1$ and $R_2$ are hydrogen, alkyl groups containing from one to four carbon atoms inclusive, or halogen atoms.

The novel thiophenecarboxaldehydes are valuable intermediates in the preparation of organic compounds, pharmaceutical compounds and the like, some of which are disclosed in the above mentioned application.

Generally, the compounds of the invention may be prepared by reacting a thiophene with an N-lower alkyl substituted formanilide in the presence of phosphorus oxychloride, phosphorus oxybromide, thionyl chloride, and like condensing agents.

The invention may be illustrated in more specific detail by the following examples:

EXAMPLE I

2-thiophenecarboxaldehyde

A mixture of 0.5 mole of N-methylformanilide and 0.5 mole of phosphorus oxychloride is placed in a flask and allowed to stand for about one half hour. About 0.5 mole of thiophene is then added to the mixture while the temperature of the reaction mixture is maintained at about 25–30° C. After the initial exothermic reaction subsides, the reaction mixture is allowed to stand for about 16 hours at room temperature. The mixture is then poured into ice water with vigorous stirring. The oily layer is separated from the aqueous mixture and is combined with the subsequent ether extracts of the aqueous phase. The ether solution is then washed with a dilute sodium bicarbonate solution until the washings are neutral, and then dried over sodium sulfate. The ether is distilled off and further distillation of the residual oil gives the 2-thiophenecarboxaldehyde, B. P. 91–92° C. at 25 mm., $n_D^{25}$ 1.5888.

EXAMPLE II

5-bromothiophene-2-carboxaldehyde

To a mixture of 0.3 mole phosphorus oxybromide dissolved in a small amount of chlorobenzene and 0.3 mole of N-methylformanilide is added dropwise about 0.36 mole of 2-bromothiophene while maintaining the temperature at about 50° C. The reaction mixture is stirred at room temperature for about 18 hours, and then hydrolyzed in ice water and isolated as per Example I. Distillation of the oily residue gives 5-bromothiophene-2-carboxaldehyde, B. P. 118–121° C. at 15 mm. The aldehyde is further purified by conversion to the sodium bisulfite derivative, regenerated with sodium carbonate solution, and fractionated to give the pure aldehyde, B. P. 114–115° C. at 14 mm., $n_D^{25}$ 1.6328.

By employing phosphorus oxychloride in place of phosphorus oxybromide the aldehyde is also obtained.

EXAMPLE III

5-chloro-2-thiophenecarboxaldehyde

Following the procedure of Example I, about one mole of 2-chlorothiophene, one mole of N-methylformanilide and about one mole of phosphorus oxychloride are reacted to give a crude 5-chloro-2-thiophene-carboxaldehyde. The crude product from the ether extracts is shaken with an equal volume of saturated sodium bisulfite solution giving a precipitate of the addition complex, which is filtered, washed with ether and dissolved in water. The aldehyde is released by adding an excess of sodium carbonate solution, which is extracted with ether. The ether extracts are dried, concentrated and the residue is distilled to give the pure aldehyde, B. P. 91–92° C. at 13 mm., $n_D^{25}$ 1.6017.

EXAMPLE IV

3-methyl-2-thiophenecarboxaldehyde

By following the procedure described in Example I, 0.3 mole of 3-methylthiophene, 0.3 mole of N-methylformanilide and about 0.3 mole of phosphorus oxychloride are reacted to produce the 3-methyl-2-thiophenecarboxaldehyde, B. P. 113–114° C. at 25 mm., $n_D^{25}$ 1.5833.

EXAMPLE V

5-methyl-2-thiophenecarboxaldehyde

By treating a mixture of about 0.3 mole of N-ethylformanilide and 0.3 mole of phosphorus oxychloride with about 0.35 mole of 2-methylthiophene, and isolating the product as described in Example I, 5-methyl-2-thiophenecarboxaldehyde is prepared, B. P. 113–114° C. at 25 mm., $n_D^{29}$ 1.5782.

Following the procedure of Example I and using the desired substituted thiophene, the following compounds may be prepared. 5-tertiary butyl-2-thiophenecarboxaldehyde, B. P. 135–136° C. at 25 mm., $n_D^{26}$ 1.5428, and 2,5-dimethyl-3-thiophene-carboxaldehyde, B. P. 116–117° C. at 25 mm., $n_D^{25}$ 1.5599. Other alkyl or halogen substituted thiophenecarboxaldehydes may be prepared by the use of the appropriate alkyl or halogen substituted thiophene.

I prefer to carry out the reaction of the invention at about room temperature. Higher temperatures will work but the yield is usually decreased. For instance, if the reaction temperature in preparing 5-chloro-2-thiophenecarboxaldehyde is raised by carying out the reaction on steam-bath, the yield is about 20% lower than carrying out the reaction at about room temperature.

In the preferred process equi-molar amounts of the reactants or a slight excess of the thiophene compound gives the best results. Using an excess of the other reactants gives lower yields.

Others may readily adapt the invention for use under various conditions of service, by employing one or more of the novel features disclosed or equivalents thereof. As at present advised with respect to the scope of my invention, I desire to claim the following subject matter.

I claim:

1. The process of producing a compound of the formula

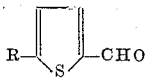

where R is a member selected from the class consisting of hydrogen and halogen, which comprises reacting a compound of the formula

where R is a member selected from the class consisting of hydrogen and halogen, with N-lower alkyl formanilide in the presence of a condensing agent.

2. The process which comprises reacting 2-chlorothiophene and N-lower alkyl formanilide in the presence of phosphorus oxychloride to produce 5-chlorothiophene-2-carboxaldehyde.

3. The process which comprises reacting 2-bromothiophene and N-lower alkyl formanilide in the presence of phosphorus oxybromide to produce 5-bromothiophene-2-carboxaldehyde.

4. The process which comprises reacting thiophene and N-methyl-formanilide in the presence of phosphorus oxychloride to produce 2-thiophenecarboxaldehyde.

ARTHUR W. WESTON.

REFERENCES CITED

The following references are of record in the file of this patent:

UNITED STATES PATENTS

| Number | Name | Date |
|---|---|---|
| 1,717,567 | Kalischer | June 18, 1929 |
| 1,807,693 | Kalischer | June 2, 1931 |

OTHER REFERENCES

King: J. Org. Chem., 13, 635–640 (1948).

Steinkopf: Die Chemie des Thiophens, pp. 21, 25 and 67, Steinkopf, Dresden, 1941 (Edwards Lithoprint, 1944).

Bernthsen and Sudborough, Org. Chem., p. 549, van Nostrand, N. Y., 1925.

Richter: Org. Chem., pp. 649–650, Wiley, N. Y., 1938.

Whitmore: Org. Chem., p. 893, van Nostrand, N. Y., 1937.

Lands: Proc. Soc. Exp. Bio. Med. 57, 55–56 (1944).

Alles: J. Pharm. Exp. Ther. 72, 265 (1941).

Powers: Advancing Fronts in Chemistry, vol. II, p. 33, Reinhold Pub. Co., N. Y., 1946.

Williams: Detoxication Mechanisms, p. 194, Wiley, N. Y., 1947.

Viaud: Produits Pharm. 2, 58, Feb. 1947.

Caesar and Sachanen: Ind. Eng. Chem. 40, 922 (1948).